US006223231B1

(12) United States Patent
Mankude

(10) Patent No.: US 6,223,231 B1
(45) Date of Patent: Apr. 24, 2001

(54) METHOD AND APPARATUS FOR HIGHLY-AVAILABLE PROCESSING OF I/O REQUESTS WHILE APPLICATION PROCESSING CONTINUES

(75) Inventor: Hariprasad B. Mankude, Fremont, CA (US)

(73) Assignee: Sun Microsystems, Inc., Palo Alto, CA (US)

( * ) Notice: Subject to any disclaimer, the term of this patent is extended or adjusted under 35 U.S.C. 154(b) by 0 days.

(21) Appl. No.: 09/190,664

(22) Filed: Nov. 12, 1998

(51) Int. Cl.$^7$ .............................. G06F 13/14; G06F 13/20
(52) U.S. Cl. .............................. 710/38; 710/36; 709/229; 709/238; 709/239; 714/6; 714/48; 395/500.23
(58) Field of Search ...................... 395/500.23; 709/239, 709/238, 229; 714/2, 6, 48; 710/36, 38

(56) References Cited

U.S. PATENT DOCUMENTS

| | | | |
|---|---|---|---|
| 4,987,532 | * 1/1991 | Noguchi | 364/200 |
| 5,513,314 | * 4/1996 | Kandasamy et al. | 395/182.04 |
| 5,621,795 | * 4/1997 | Baker et al. | 380/21 |
| 5,633,999 | * 5/1997 | Clowes et al. | 395/182.04 |
| 5,818,448 | * 10/1998 | Katiyar | 345/335 |
| 5,828,847 | * 10/1998 | Gehr et al. | 395/200.69 |
| 6,038,589 | * 3/2000 | Holdsworth et al. | 709/201 |
| 6,101,323 | * 8/2000 | Quarles et al. | 395/500.23 |

FOREIGN PATENT DOCUMENTS

| | | |
|---|---|---|
| 0 709 779 A2 | 1/1996 | (EP) . |
| 0 709 779 A3 | 1/1996 | (EP) . |
| 0 843 450 A2 | 5/1998 | (EP) . |
| 0 843 450 A3 | 2/1999 | (EP) . |

OTHER PUBLICATIONS

"Local Area Network Server Replacement Procedure", IBM TDB, vol. 38, Issue 1, pp. 235–236, Jan. 1995.*

* cited by examiner

Primary Examiner—Thomas Lee
Assistant Examiner—Rehana Perveen
(74) Attorney, Agent, or Firm—Park, Vaughan & Fleming LLP

(57) ABSTRACT

One embodiment of the present invention provides a system that allows an I/O request to proceed when a primary server that is processing the I/O request fails, and a secondary server takes over for the primary server. Upon receiving an I/O request from an application running on a client, the system stores parameters for the I/O request on the client, and sends the I/O request to the primary server. Next, the system allows the application on the client to continue executing while the I/O request is being processed. If the primary server fails after the I/O request is sent to the primary server, but before an I/O request completion indicator returns from the primary server, the system retries the I/O request to the secondary server using the parameters stored on the client. The I/O request may originate from a number of different sources, including a file system access, an I/O request from a database system, and a paging request from a virtual memory system. In a variation on the above embodiment, the act of storing the parameters for the I/O request on the client includes creating a distributed object defined within a distributed object-oriented programming environment, and sending a reference to the distributed object to the primary server to be stored on the primary server. This causes a distributed operating system to keep track of the reference so that if the primary server fails, the reference count on the distributed object drops to zero and the distributed operating system notifies the client that the distributed object is unreferenced. This allows the client to deduce that the primary server has failed.

22 Claims, 3 Drawing Sheets

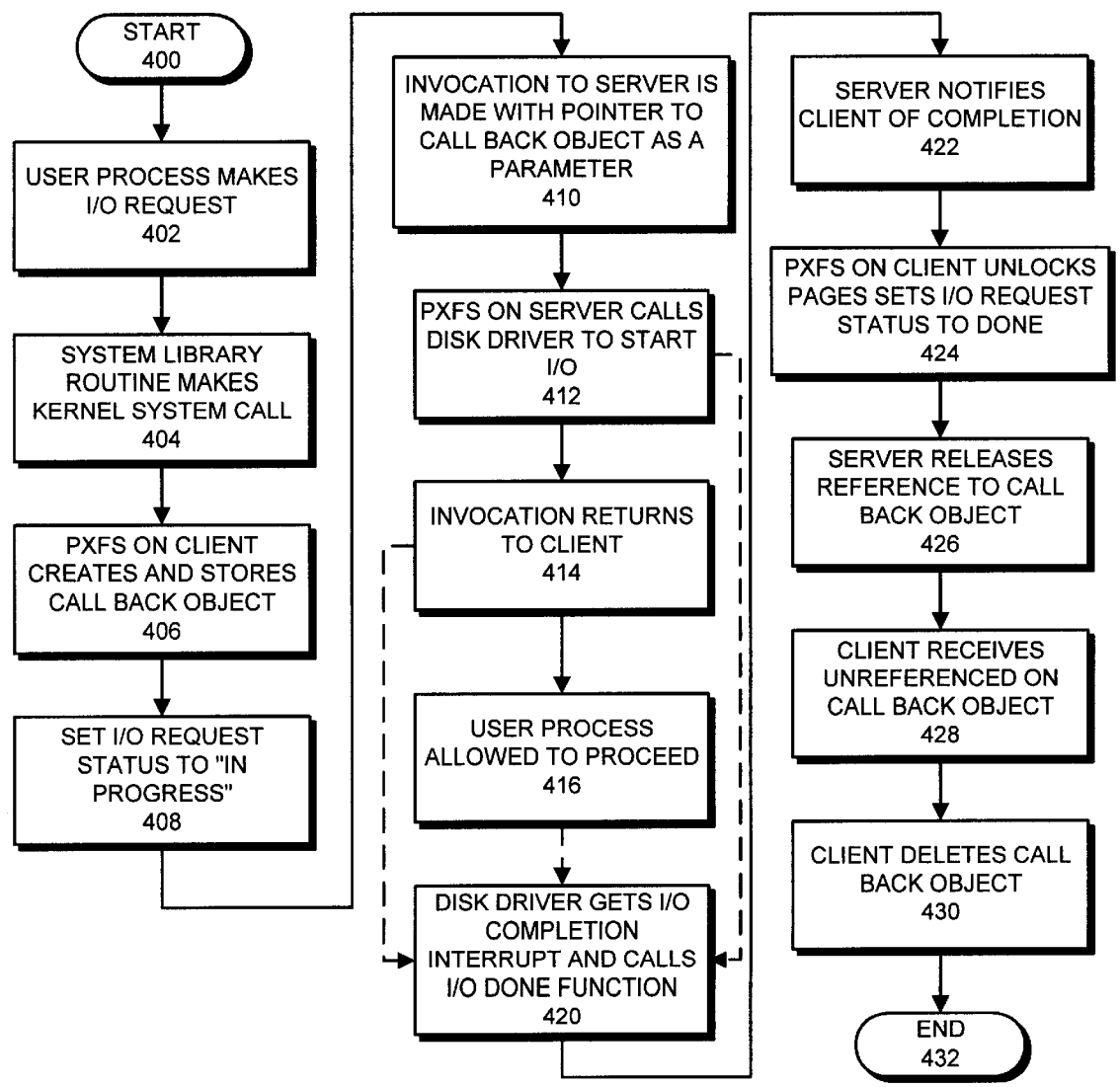

METHOD AND APPARATUS FOR HIGHLY-AVAILABLE PROCESSING OF I/O REQUESTS WHILE APPLICATION PROCESSING CONTINUES

BACKGROUND

1. Field of the Invention

The present invention generally relates to operating systems for fault-tolerant distributed computing systems. More particularly, the present invention relates to a system and method that supports asynchronous I/O requests that can switch to a secondary server if a primary server for the I/O request fails.

2. Related Art

As computer networks are increasingly used to link stand-alone computer systems together, distributed operating systems have been developed to control interactions between multiple computer systems on a computer network. Distributed operating systems generally allow client computer systems to access resources or services on server computer systems. For example, a client computer system may access information contained in a database on a server computer system. However, when the server fails, it is desirable for the distributed operating system to automatically recover from this failure without the user client process being aware of the failure. Distributed computer systems possessing the ability to recover from such server failures are referred to as "highly available systems," and data objects stored on such highly available systems are referred to as "highly available data objects."

To function properly, a highly available system must be able to detect a failure of a primary server and reconfigure itself so that accesses to objects on the failed primary server are redirected to backup copies on a secondary server. This process of switching over to a backup copy on the secondary server is referred to as a "failover."

Asynchronous I/O requests are particularly hard to implement in highly available systems. Asynchronous I/O requests allow a process to initiate an I/O request and continue processing while the I/O request is in progress. In this way, the process continues doing useful work—instead of blocking—while the I/O request is in progress, thereby increasing system performance. Unfortunately, a process typically has little control over when the I/O request completes. This lack of control over the timing of I/O requests can create problems in highly available systems, which must be able to recover from primary server failures that can occur at any time while an asynchronous I/O request is in progress.

What is needed is a highly available system that supports asynchronous I/O requests that can switch to a secondary server if a primary server for the I/O request fails.

SUMMARY

One embodiment of the present invention provides a system that allows an I/O request to proceed when a primary server that is processing the I/O request fails, and a secondary server takes over for the primary server. Upon receiving an I/O request from an application running on a client, the system stores parameters for the I/O request on the client, and sends the I/O request to the primary server. Next, the system allows the application on the client to continue executing while the I/O request is being processed. If the primary server fails after the I/O request is sent to the primary server, but before an I/O request completion indicator returns from the primary server, the system retries the I/O request to the secondary server using the parameters stored on the client. The I/O request may originate from a number of different sources, including a file system access, an I/O request from a database system, and a paging request from a virtual memory system. In a variation on the above embodiment, the act of storing the parameters for the I/O request on the client includes creating a distributed object defined within a distributed object-oriented programming environment, and sending a reference to the distributed object to the primary server to be stored on the primary server. This causes a distributed operating system to keep track of the reference so that if the primary server fails, the reference count on the distributed object drops to zero and the distributed operating system notifies the client that the distributed object is unreferenced. This allows the client to deduce that the primary server has failed.

One aspect of the above embodiment involves locking a page of memory associated with the I/O request before sending the I/O request to the primary server. This ensures that the page remains unmodified in case the I/O request needs to be retried. The page is ultimately unlocked when the I/O request completes and the primary server informs the client of the completion of the I/O request.

Still other embodiments of the present invention will become readily apparent to those skilled in the art from the following detailed description, wherein is shown and described only the embodiments for the invention by way of illustration of the best modes contemplated for carrying out the invention. As will be realized, the invention is capable of other and different embodiments and several of its details are capable of modifications in various obvious respects, all without departing from the spirit and scope of the present invention. Accordingly, the drawings and detailed description are to be regarded as illustrative in nature and not as restrictive.

DESCRIPTION OF THE FIGURES

FIG. 3 illustrates part of the internal structure of a callback object in accordance with an embodiment of the present invention.

FIG. 4 is a flow chart illustrating some of the operations involved in performing an asynchronous I/O operation in accordance with an embodiment of the present invention.

DETAILED DESCRIPTION OF THE INVENTION

Description of Distributed System

Figure 1:
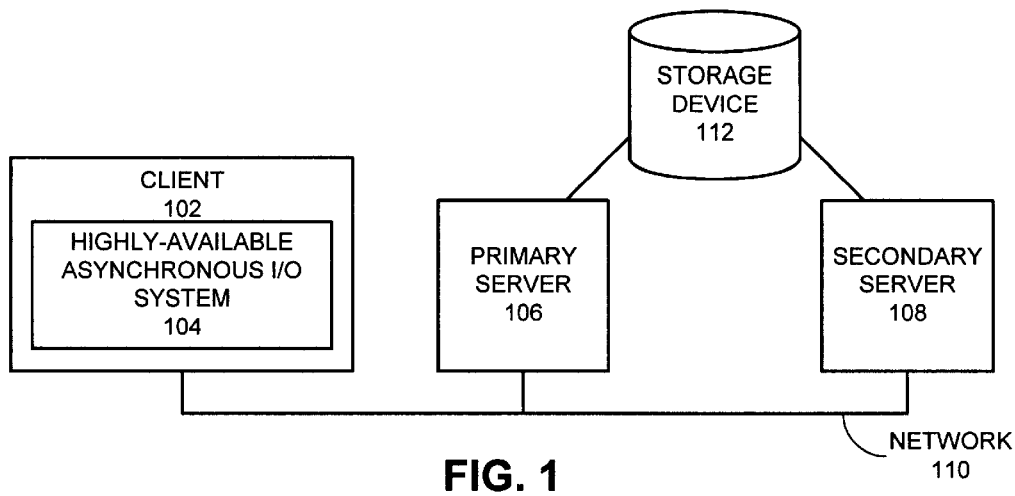
FIG. 1 illustrates a distributed computing system in accordance with an embodiment of the present invention.

FIG. 1 illustrates a distributed computing system in accordance with an embodiment of the present invention. This distributed computing system includes network 110, which is coupled to client 102, primary server 106 and secondary server 108. Network 110 generally refers to any type of wire or wireless link between computers, including, but not limited to, a local area network, a wide area network, or a combination of networks. In general, a client, such as client 102, refers to an entity that requests a resource or a service. Correspondingly, a server, such as primary server 106 or secondary server 108, services requests for resources and services. In certain cases, the client and server for an object may exist on the same computing node. In other cases, the client and server exist for an object on different computing nodes. In the example illustrated in FIG. 1, client 102, primary server 106 and secondary server 108 exist on separate computing nodes.

Primary server 106 and secondary server 108 are coupled to storage device 112. Storage device 112 includes non-volatile storage for data to be accessed by primary server 106 and secondary server 108. Although FIG. 1 illustrates direct communication links from storage device 112 to primary server 106 and to secondary server 108, these communication links may actually be implemented by messages across network 110, or another independent network.

In one embodiment of the present invention, the operating system for the distributed computing system illustrated in FIG. 1 is the Solaris MC operating system, which is a product of Sun Microsystems, Inc. of Palo Alto, Calif. The Solaris MC operating system is a UNIX-based operating system. Hence, in describing the present technology, UNIX terminology and concepts are frequently used. However, this usage is for purposes of illustration and is not to be construed as limiting the invention to this particular operating system.

In the illustrated embodiment, client 102 includes highly-available asynchronous I/O system 104, which may be implemented as a library and which facilitates asynchronous I/O operations that can be directed to a secondary server 108 when a primary server 106 that is processing the I/O request fails. For example, assume client 102 has an outstanding I/O request to primary server 106. If primary server 106 fails while this I/O request is outstanding, client 102 is eventually notified by the distributed operating system that primary server 106 failed. This causes client 102 to retry the failed I/O request on secondary server 108. Note that secondary server 108 is capable of processing the same I/O request because it also can access storage device 112.

Functional Components Involved in Asynchronous I/O

Figure 2:
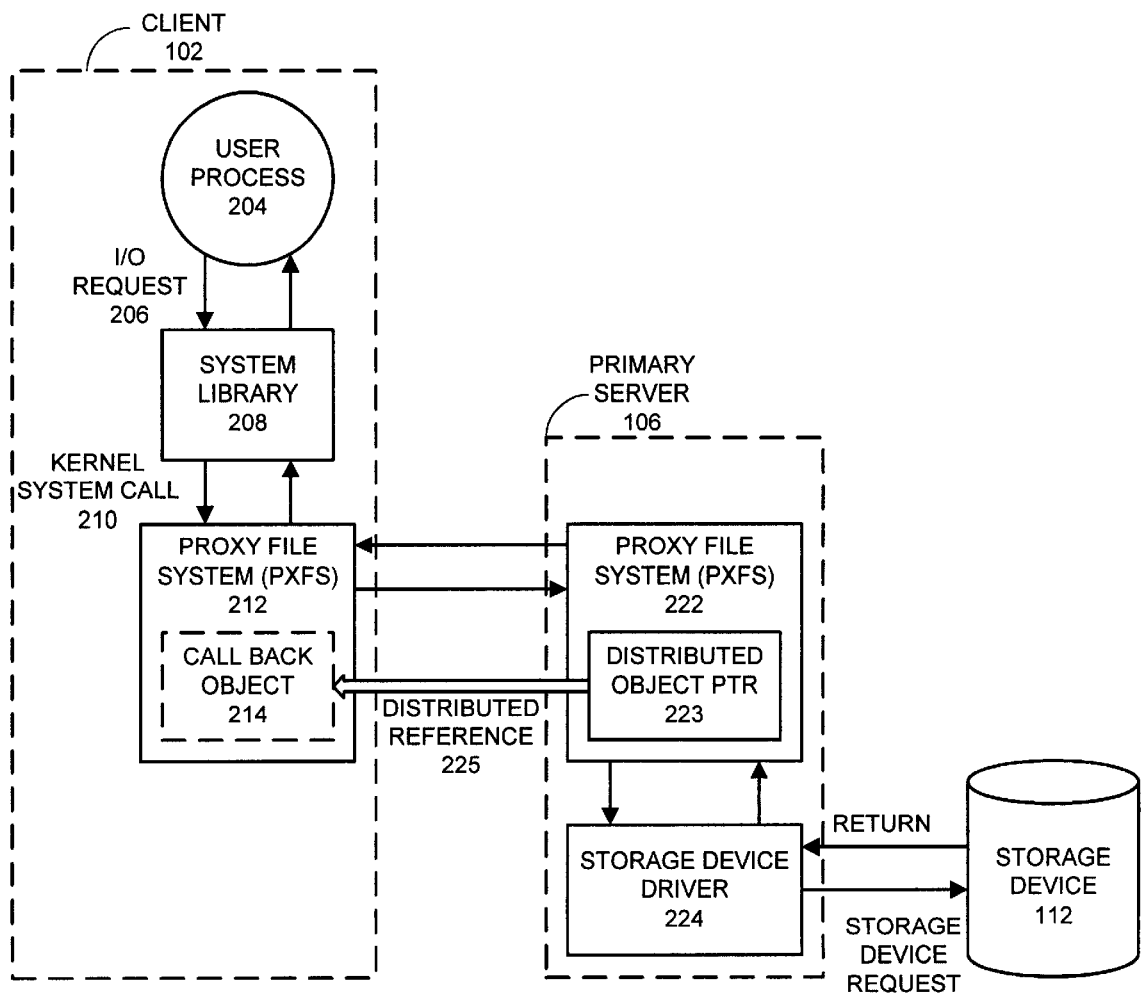
FIG. 2 illustrates functional components within a client and a primary server involved in implementing highly available asynchronous I/O operations in accordance with an embodiment of the present invention.

FIG. 2 illustrates functional components within client 102 and primary server 106, which are involved in implementing highly available asynchronous I/O operations in accordance with an embodiment of the present invention. In the illustrated embodiment, client 102 from FIG. 1 contains user process 204. User process 204 makes an I/O request by calling an I/O function from system library 208. System library 208 includes functions that communicate with proxy file system (PXFS) 212.

User process 204 may include any process in client 102 that is capable of generating an I/O request to primary server 106. This includes, but is not limited to a user process that generates a file system reference, a database process that generates a database access, and a paging system that generates a page reference. Although FIG. 2 presents a "user" process for illustrative purposes, in general, any "user" or "system" process may generate the I/O request.

System library 208 includes a collection of functions that implement various system calls, including functions that carry out I/O requests. An I/O routine within system library 208 typically converts a user-level system call from user process 204 into a kernel-level system call to perform the I/O operation.

Proxy file system (PXFS) 212 is part of a highly available distributed file system that supports failovers from a primary server 106 to a secondary server 108 when primary server 106 fails. In the illustrated embodiment, PXFS 212 includes callback object 214, which contains information related to an associated asynchronous I/O operation.

PXFS 212 within client 102 communicates with PXFS 222 within primary server 106. Note that PXFS 212 within client 102 and PXFS 222 within primary server 106 are different parts of the same distributed file system. PXFS 222 includes distributed object pointer 223, which is a reference to a callback object 214 within client 102. In fact, distributed object pointer 223 creates a distributed reference 225 to callback object 214. If primary server 106 fails, distributed reference 225 disappears. This causes the count of active references to callback object 214 to drop to zero, which causes the distributed operating system to notify PXFS 212 on client 102 that callback object 214 is unreferenced. Since primary server 106 is the only entity holding a reference to callback object 214, client 102 can conclude that primary server 106 has failed.

Primary server 106 additionally contains storage device driver 224, which receives commands from PXFS 222 and, in response to these commands, accesses storage device 112.

Storage device driver 224 communicates with storage device 112 in order to perform specified I/O operations to storage device 112.

FIG. 3 illustrates part of the internal structure of a callback object 214 in accordance with an embodiment of the present invention. The embodiment illustrated in FIG. 3 includes pointer to I/O request 302 and I/O request status 304. Pointer to I/O request 302 is a pointer to an I/O request object containing information related to the pending I/O request. This pointer allows the pending I/O request to be retried on secondary server 108 when primary server 106 fails. Although the embodiment of callback object 214 illustrated in FIG. 3 takes the form of an object defined within an object-oriented programming system, in general, any type of data structure that stores equivalent data items may be used. Note that client 102 creates and maintains a separate callback object 214 for each pending I/O request.

Asynchronous I/O Process

FIG. 4 is a flow chart illustrating some of the operations involved in performing an asynchronous I/O operation in accordance with an embodiment of the present invention. These operations are described with reference to the functional components illustrated in FIG. 2. First, user process 204 (from FIG. 2) makes an I/O request (step 402). As mentioned previously, this I/O request may include any type of I/O request to storage device 112 (from FIG. 2), including a file system access, an I/O request from a database system, or a paging request from a virtual memory system. Next, I/O request 206 executes a system call from within system library 208 (step 404). This system call generates a kernel system call 210, which accesses proxy file system (PXFS) 212 on client 102.

In processing the I/O request, PXFS 212 creates and stores callback object 214 (step 406). In doing so, PXFS 212 initializes pointer to I/O request 302 from FIG. 3 to point to an associated I/O request object (in order to allow the I/O request to be retried), as well as setting I/O request status 304 to "in progress." (step 408)

Next, PXFS 212 makes an invocation to primary server 106 (step 410). This invocation includes a reference to callback object 214. In response to the invocation, PXFS 222 in primary server 106 stores the reference to callback object 214 as distributed object pointer 223. This causes a distributed operating system to keep track of a distributed reference 225 to callback object 214. If primary server 106 fails, the distributed operating system notifies client 102 that callback object 214 is unreferenced. Since primary server 106 is the only entity holding a reference to callback object 214, client 102 can conclude that primary server 106 has failed; client 102 can then take appropriate action.

Next, PXFS 222 on primary server 106 calls storage device driver 224 to start an I/O operation (step 412). Storage device driver 224 initiates the I/O operation by sending a command to storage device 112. At this point the invocation returns to client 102 (step 414). Next, PXFS 212 on client 102 then forwards the return to user process 204, which allows user process 204 to continue processing (step 416). User process 204 can thereby perform useful work instead of waiting for the I/O operation to complete. In the mean time, the I/O operation continues processing and completes at some undetermined time in the future.

When the I/O request is completed by storage device 112, storage device 122 sends an interrupt to storage device driver 224. In response to the interrupt, storage device driver 224 calls I/O done function (step 420). This function causes primary server 106 to notify client 102 that the I/O request is complete (step 422). Furthermore, if the I/O request was for a read operation, data read from storage device 112 is passed back from client 102 to primary server 106 at this time. Next, PXFS 212 on client 102 sets I/O request status 304 to "done," and unlocks any pages that were locked during the I/O request (step 424). During an I/O operation, the pages remain locked until the I/O operation completes to prevent the pages from being swapped out or deleted when the I/O is in progress. Note that the pages are locked at some time before the I/O operation is sent to primary server 106 in step 410. Also note that the interrupt may complete (in step 420) at any time after the I/O request starts in step 412, because the I/O request is executing on a separate thread. Hence, step 420 may follow any of states 412, 414 and 416 as is indicated by the dashed lines.

Next, primary server 106 releases distributed reference 225 to callback object 214 (step 426). Since there is only one reference to callback object 214, when distributed reference 225 is released, callback object 214 is unreferenced. The distributed operating system will eventually detect this fact and client 102 will receive an "unreferenced" message on callback object 214 (step 428). In response to this unreferenced message, client 102 examines I/O request status 304 within callback object 214. If I/O request status indicates the I/O request is complete, client 102 finally deletes callback object 214 (step 430). At this point, the I/O operation is complete.

Failure Recovery

Figure 5:
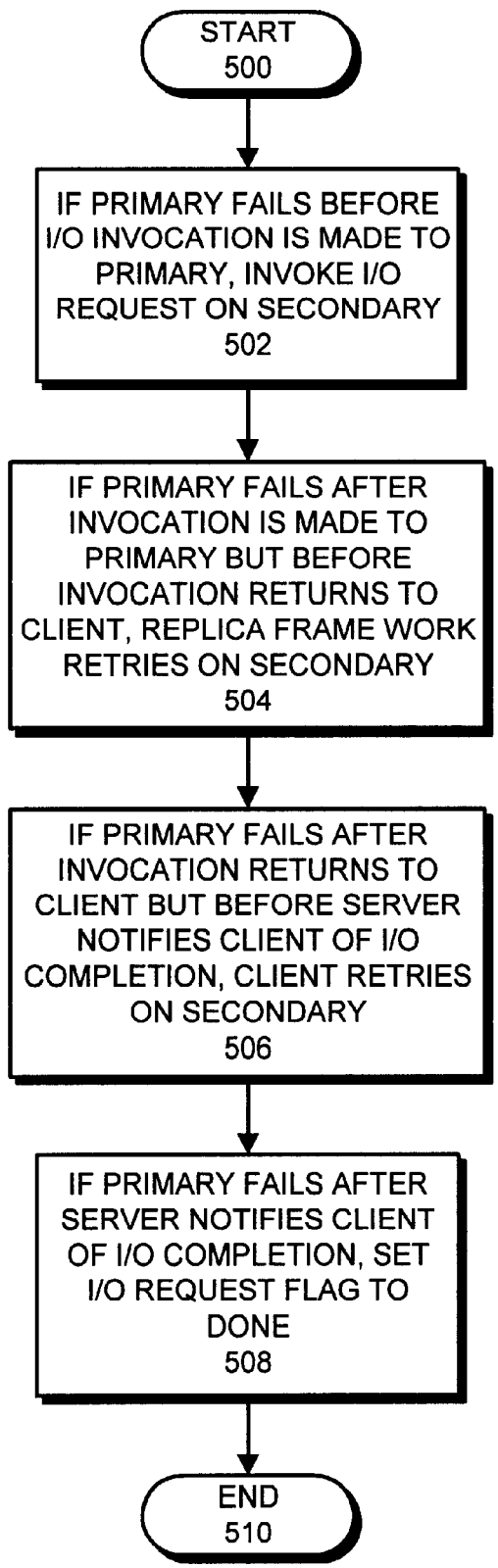
FIG. 5 is a flow chart illustrating some of the operations involved in recovering from a failure during an asynchronous I/O operation in accordance with an embodiment of the present invention.

FIG. 5 is a flow chart illustrating some of the operations involved in recovering from a failure during an asynchronous I/O operation in accordance with an embodiment of the present invention. If primary server 106 fails before the I/O invocation is made to primary server 106 (in step 410 of FIG. 4), the invocation is automatically retried to secondary server 108 from FIG. 1 by the distributed operating system (step 502).

Next, if primary server 106 fails after the I/O invocation to primary server 106 is made in step 410, but before the invocation returns to client 102 in step 414, the replica framework of the distributed operating system performs a retry of the I/O request to secondary server 108 (step 504). In the illustrated embodiment, the replica framework is part of the Solaris MC operating system produced by SUN Microsystems, Inc. of Palo Alto, Calif. However, other operating systems can use analogous mechanisms to perform the retry. Note that before the invocation reaches primary server 106, distributed reference 225 to callback object 214 may not exist. Hence, client 102 cannot rely on receiving an unreferenced notification in case primary server 106 dies.

Next, if primary server 106 fails after the invocation returns to client 102 (in step 414), but before primary server 106 notifies client 102 of completion of the I/O operation in step 422, a series of events take place (step 506). When primary server 106 dies, the reference count maintained by the distributed operating system for callback object 214 drops to zero. This is detected by the distributed operating system, and client 102 receives an unreferenced message on callback object 214 from the distributed operating system. In response to this unreferenced message, PXFS 212 in client 102 checks to make certain that I/O request status 304 within callback object 214 is set to "in progress." If so, PXFS 212 retries the I/O request to secondary server 108 using the original request structure indexed by pointer to I/O request 302 within callback object 214. Note that user process 204 is not aware of this failure.

If primary server 106 fails after primary server 106 notifies client 102 of completion of the I/O request, client 102 sets I/O request status 304 to "done." (step 508). Primary server 106 additionally cleans up the data structures associated with the I/O request. This may include unlocking pages involved in the I/O request and deleting callback object 214.

CONCLUSION

Thus, the present invention supports highly-available asynchronous I/O requests that can switch to a secondary server if a primary server for the I/O request fails.

While the invention has been particularly shown and described with reference to embodiments thereof, those skilled in the art will understand that the foregoing and other changes in form and detail may be made therein without departing from the spirit and scope of the present invention.

What is claimed is:

1. A method that allows an I/O request to proceed when a primary server that is processing the I/O request fails, and a secondary server takes over for the primary server, the method comprising:

receiving the I/O request from a client application running on a client;

storing parameters for the I/O request on the client;

sending the I/O request to the primary server;

returning control to the client;

allowing the client application to continue executing while the I/O request is being processed;

sending a notification of I/O completion from the server to the client, wherein failure to receive the notification indicates failure of the primary server; and if the primary server fails after the I/O request is sent to the primary server but before an I/O request completion indicator returns from the primary server, retrying the I/O request to the secondary server using the parameters for the I/O request stored on the client.

2. The method of claim 1, wherein the act of retrying the I/O request to the secondary server takes place without the client application being aware of the failure of the primary server.

3. The method of claim 1, wherein the act of storing the parameters for the I/O request on the client includes:

creating a distributed object defined within a distributed object-oriented programming environment; and sending a reference to the distributed object to be stored on the primary server causing a distributed operating system to keep track of the reference;

wherein if the primary server fails, the distributed operating system notifies the client that the distributed object is unreferenced, allowing the client to conclude that the primary server has failed.

4. The method of claim 1, further comprising if the primary server fails before the I/O request completion indicator is sent to the primary server, sending the I/O request to the secondary server.

5. The method of claim 1, wherein the act of storing parameters for the I/O request includes storing a status indicator for the I/O request on the client, the status indicator indicating whether the I/O request is in progress or complete.

6. The method of claim 5, further comprising if the primary server completes and returns the I/O request completion indicator to the client, setting the status indicator to a value indicating that the I/O request is complete.

7. The method of claim 1, further comprising if the primary server completes and returns the I/O request completion indicator to the client, removing the parameters for the I/O request previously stored on the client.

8. The method of claim 1, further comprising:
locking a page of memory associated with the I/O request before sending the I/O request to the primary server; and
unlocking the page of memory if the primary server completes and returns the I/O request completion indica for to the client.

9. The method of claim 1, wherein the I/O request is one of, a file system access, an I/O request from a database system, and a paging request from a virtual memory system.

10. A computer readable storage medium storing instructions that when executed by a computer cause a computer to perform a method that allows an I/O request to proceed when a primary server that is processing the I/O request fails, and a secondary server takes over for the primary server, the method comprising:
receiving the I/O request from a client application running on a client;
storing parameters for the I/O request on the client;
sending the I/O request to the primary server;
returning control to the client;
allowing the client application to continue executing while the I/O request is being processed;
sending a notification of I/O completion from the server to the client, wherein failure to receive the notification indicates failure of the primary server; and
if the primary server fails after the I/O request is sent to the primary server but before an I/O request completion indicator returns from the primary server, retrying the I/O request to the secondary server using the parameters for the I/O request stored on the client.

11. A computer instruction signal embodied in a carrier wave carrying instructions that when executed by a computer perform a method that allows an I/O request to proceed when a primary server that is processing the I/O request fails, and a secondary server takes over for the primary server, the method comprising:
receiving the I/O request from a client application running on a client;
storing parameters for the I/O request on the client;
sending the I/O request to the primary server;
returning control to the client;
allowing the client application to continue executing while the I/O request is being processed;
sending a notification of I/O completion from the server to the client, wherein failure to receive the notification indicates failure of the primary server; and
if the primary server fails after the I/O request is sent to the primary server but before an I/O request completion indicator returns from the primary server, retrying the I/O request to the secondary server using the parameters for the I/O request stored on the client.

12. A method that allows an I/O request to proceed when a primary server that is processing the I/O request fails, and a secondary server takes over for the primary server, the method comprising:
receiving the I/O request from a client application running on a client;
storing parameters for the I/O request on the client, the parameters including a status indicator for indicating whether the I/O request is in progress or complete;
sending the I/O request to the primary server;
returning control to the client;
allowing the client application to continue executing while the I/O request is being processed;
sending a notification of I/O completion from the server to the client, wherein failure to receive the notification indicates failure of the primary server;
if the primary server fails before the I/O request is sent to the primary server, sending the I/O request to the secondary server;
if the primary server fails after the I/O request is sent to the primary server but before an I/O request completion indicator returns from the primary server, retrying the I/O request to the secondary server using the parameters for the I/O request stored on the client, the retrying taking place without the client application being aware of the failure of the primary server; and
if the primary server completes and returns the I/O request completion indicator to the client, setting the status indicator to a value indicating that the I/O request is complete.

13. The method of claim 12, wherein the act of storing the parameters for the I/O request on the client includes:
creating a distributed object defined within a distributed object-oriented programming environment; and
sending a reference to the distributed object to be stored on the primary server causing a distributed operating system to keep track of the reference; wherein if the primary server fails, the distributed operating system notifies the client that the distributed object is unreferenced, allowing the client to conclude that the primary server has failed.

14. The method of claim 12, further comprising if the primary server completes and returns the I/O request completion indicator to the client, removing the parameters for the I/O request previously stored on the client.

15. The method of claim 12, further comprising:
locking a page of memory associated with the I/O request before sending the I/O request to the primary server; and
unlocking the page of memory if the primary server completes and returns the I/O request completion indicator to the client.

16. The method of claim 12, wherein the I/O request is one of, a file system access, an I/O request from a database system, and a paging request from a virtual memory system.

17. An apparatus that allows an I/O request to proceed when a primary server that is processing the I/O request fails, and a secondary server takes over for the primary server, comprising:

an I/O processing mechanism that is configured to receive the I/O request from a client application running on a client, store parameters for the I/O request on the client, and send the I/O request to the primary server;

a returning mechanism that is configured to return control to the client after the I/O request is started;

an execution mechanism that allows the client application to continue executing while the I/O request is being processed;

a sending mechanism that is configured to send a notification of I/O completion from the server to the client, wherein failure to receive the notification indicates failure of the primary server; and a retrying mechanism that retries the I/O request to the secondary server using the parameters for the I/O request stored on the client if the primary server fails after the I/O request is sent to the primary server but before an I/O request completion indicator returns from the primary server.

18. The apparatus of claim 17, wherein the retrying mechanism is configured to retry the I/O request to the secondary server without the client application being aware of the failure of the primary server.

19. The apparatus of claim 17, wherein upon receiving the I/O request the I/O processing mechanism is configured to:

create a distributed object defined within a distributed object-oriented programming environment; and send a reference to the distributed object to be stored on the primary server causing a distributed operating system to keep track of the reference;

wherein if the primary server fails, the distributed operating system notifies the client that the distributed object is unreferenced, allowing the client to conclude that the primary server has failed.

20. The apparatus of claim 17, wherein the retrying mechanism is configured to send the I/O request to the secondary server if the primary server fails before the I/O request is sent to the primary server.

21. The apparatus of claim 17, wherein the I/O processing mechanism is configured to store a status indicator for the I/O request on the client, the status indicator indicating whether the I/O request is in progress or complete.

22. The apparatus of claim 17, further comprising a page locking mechanism that is configured to lock a page of memory associated with the I/O request before sending the I/O request to the primary server, and to unlock the page of memory if the primary server completes and returns the I/O request completion indicator to the client.

* * * * *